H. D. WILLIAMS & R. JANNEY.
OSCILLATION CONTROL MECHANISM.
APPLICATION FILED JUNE 29, 1912.
1,062,561.
Patented May 20, 1913.
6 SHEETS—SHEET 6.
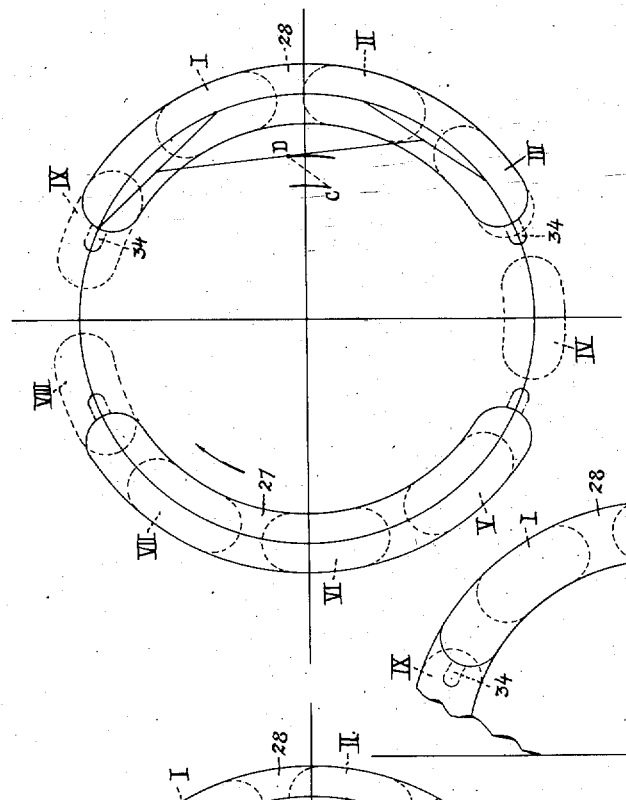
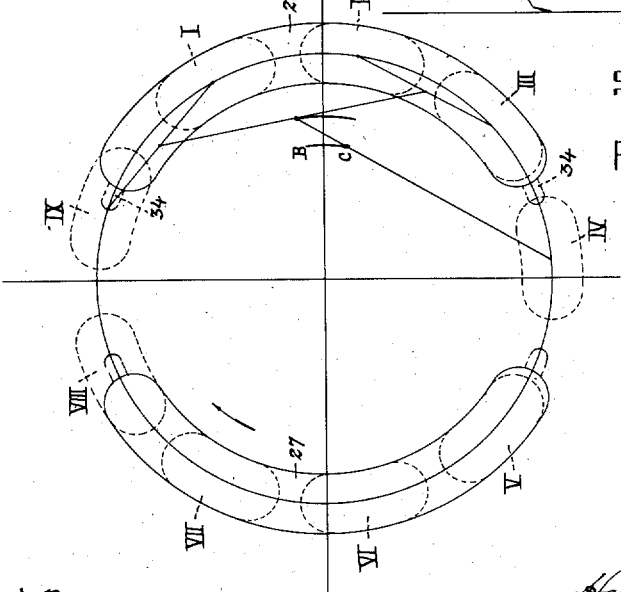
WITNESSES
George Du Bois
G. V. Rasmussen
INVENTORS
Harvey D. Williams
Reynold Janney
BY
Fiesen Kauk
ATTORNEYS

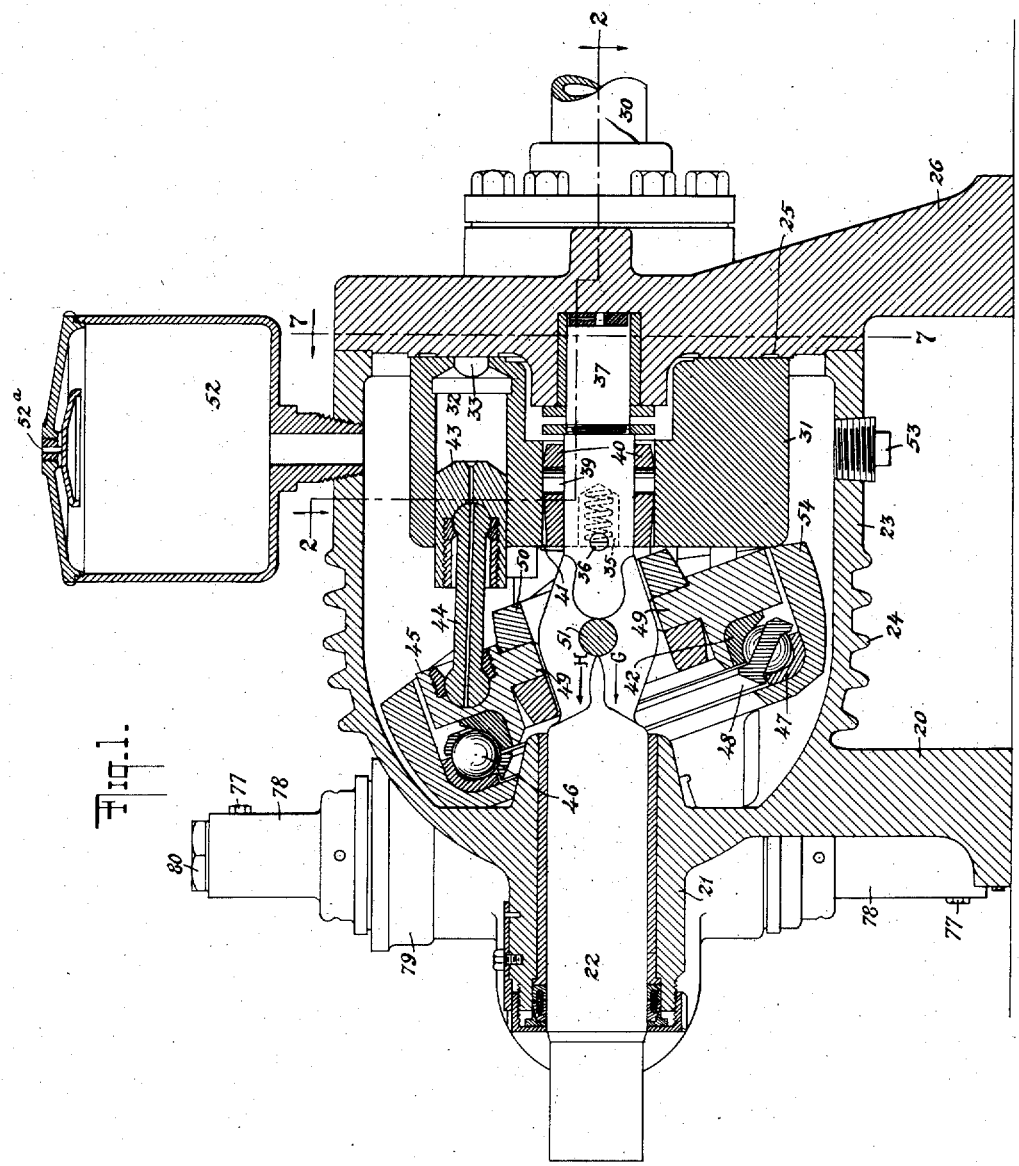

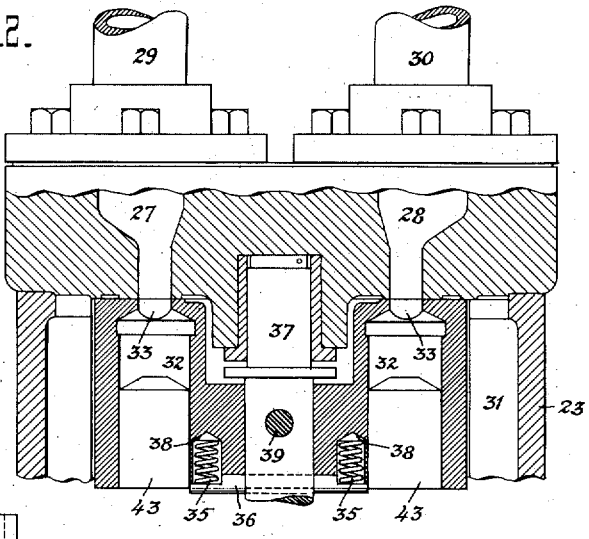
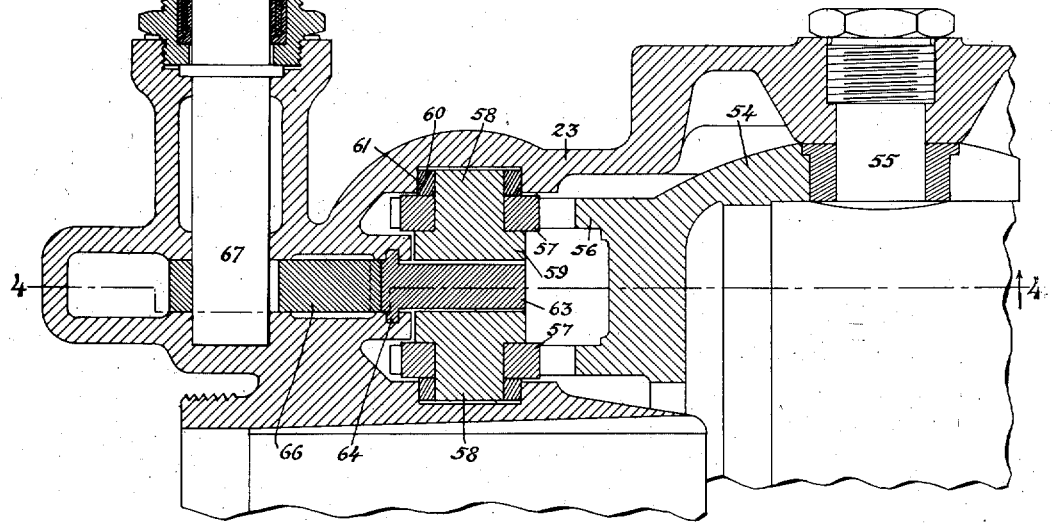

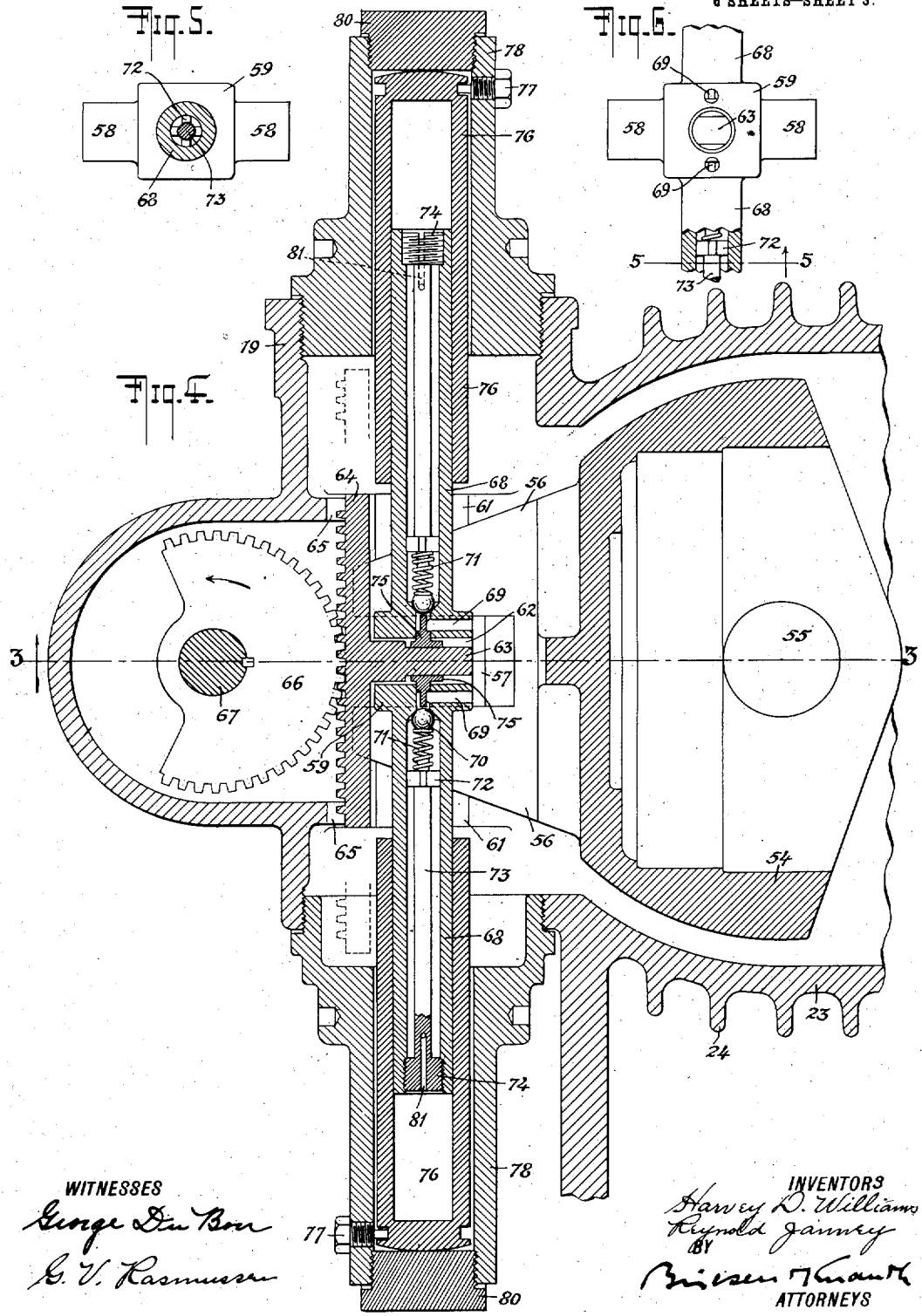

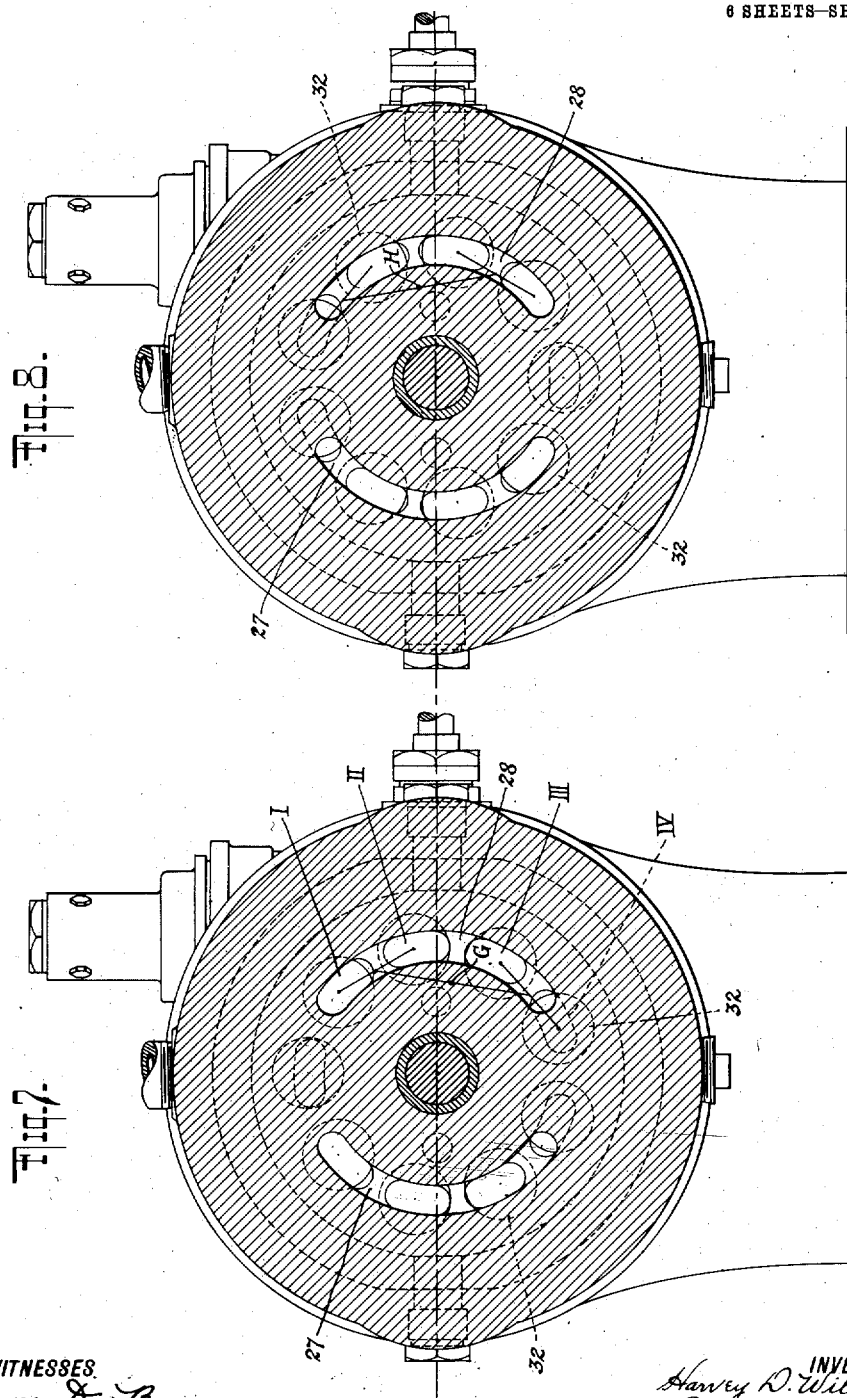

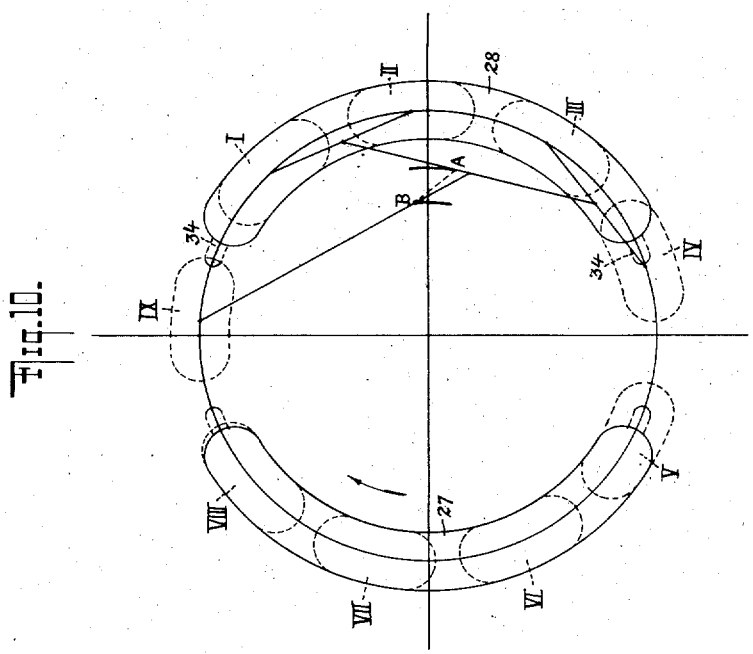
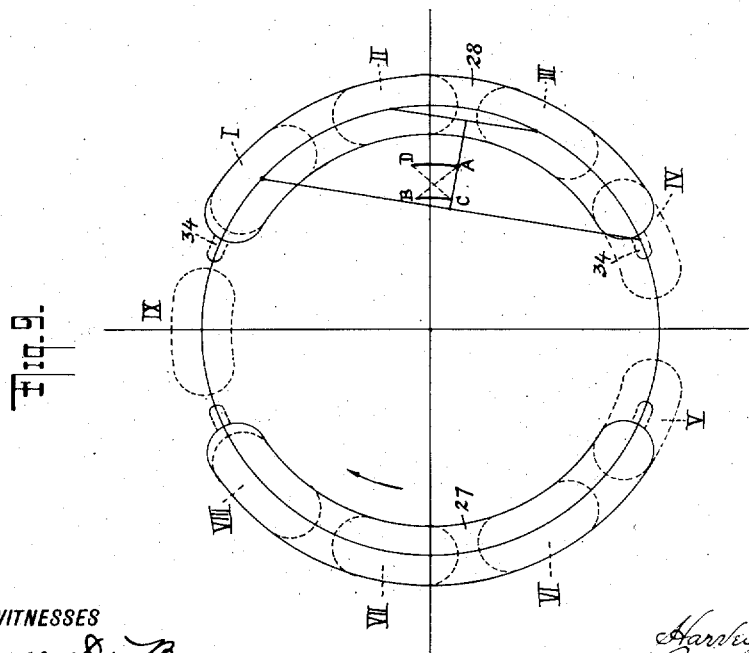

UNITED STATES PATENT OFFICE.

HARVEY D. WILLIAMS AND REYNOLD JANNEY, OF NEW YORK, N. Y.

OSCILLATION-CONTROL MECHANISM.

1,062,561.  Specification of Letters Patent.  Patented May 20, 1913.

Original application filed June 3, 1911, Serial No. 631,092. Divided and this application filed June 29, 1912. Serial No. 706,612.

*To all whom it may concern:*

Be it known that we, HARVEY D. WILLIAMS and REYNOLD JANNEY, both citizens of the United States, and residents of the borough of Manhattan, city, county, and State of New York, have invented certain new and useful Improvements in Oscillation-Control Mechanism, of which the following is a specification.

Our invention relates to devices for controlling or adjusting other mechanism and has special application for controlling or adjusting a machine part which is subjected to oscillating stresses or pulsations. In such cases the pulsations are utilized to effect or assist the adjustment of said part, and also to lock or hold it after adjustment.

Our invention may be used in connection with rotary pumps of variable discharge such as described as one of the members of a variable speed gear in Letters Patent No. 925,148 granted to one of us (Harvey D. Williams) on June 15, 1909. In this patented device, the discharge of the pump can be varied by adjusting the inclination of a rotary tilting box or race which according to the angle it forms with a plane perpendicular to the shaft, gives a longer or shorter stroke to the pump pistons. When our present invention is utilized in connection with such a device it acts to assist the manual operation of adjusting or inclining the tilting box, making this operation quicker and easier. Furthermore, it acts to lock the tilting box in whatever position it happens to be when the manual effort for tilting ceases. These results are attained by utilizing, in the manner set forth hereinafter, certain changes which occur during the operation of the apparatus, as regards the position of the center of pressure on the tilting box and the parts sharing its adjustment.

The present application is a division of our application, Serial Number 631,092, filed June 3, 1911 and discloses our invention as applied to a pump mechanism such as is referred to above. It will be understood however that our invention is in general applicable to any mechanism a part of which is subjected to pulsations or oscillations and that while we have shown and described but one specific embodiment thereof, the invention is capable of numerous changes in arrangement and application such as may fall within the scope and spirit of the appended claims.

Reference is to be had to the accompanying drawings in which—

Figure 1 is a longitudinal vertical section of mechanism embodying our present invention; Fig. 2 is a partial horizontal section, taken on line 2—2 of Fig. 1; Fig. 3 is a horizontal section, upon a larger scale than Figs. 1 and 2, and taken on line 3—3 of Fig. 4; Fig. 4 is a vertical section on line 4—4 of Fig. 3; Figs. 5 and 6 are details of the adjusting piston, Fig. 5 being a cross section on line 5—5 of Fig. 6. Figs. 7 and 8 are vertical cross sections, on the plane indicated by the line 7—7 of Fig. 1, showing the cylinder barrel of the pump in two different positions, and Figs. 9 to 13 are diagrammatic views of the ports in the stationary valve plate and the ports of the cylinder barrel, Fig. 13 being a partial view only.

In its general features, the pump represented in the accompanying drawings corresponds to the one forming part of the variable speed gear shown in the aforesaid Letters Patent No. 925,148, and a brief description of these general features will therefore suffice.

The standard 20 which carries the bearing 21 for the drive shaft 22, is connected rigidly or made integral with the closed casing or shell 23 (provided with cooling ribs 24 to dissipate heat) connected with the stationary valve plate 25 on the standard 26. The valve plate 25 has two segmental ports 27 and 28 one of which acts as a suction port and the other as a delivery port, these ports being connected with corresponding pipes or conduits 29 and 30 respectively. The inner surface of the valve plate 25 is engaged by a rotary barrel 31 made with longitudinal cylinders 32 provided at the ends adjacent to the valve plate, with contracted ports 33 (*i. e.* ports smaller than the cylinder bore) arranged to register with the valve plate ports 27 and 28. Preferably the latter ports are made with reduced extensions as shown at 34 in Figs. 9 to 12, for the purpose of equalizing the action as set forth in said Patent No. 925,148. The barrel 31 is pressed toward the valve plate 25 by two springs 35 engaging, at one end, a pin 36 secured to the shaft 37 and at the other end the end walls of longitudinal recesses 38 in the barrel 31. The latter is held to rotate with the shaft by means of a pin 39 which connects the shaft with two keys 40 fitted into longitudinal keyways 41 of the barrel 31. The keys are beveled toward both ends so that the barrel may rock slightly to bring its contact face into perfect engagement with the corresponding face of the valve plate 25. The shaft 37 is journaled in the valve plate 25.

In the cylinders 32 are adapted to reciprocate the pistons 43 pivotally connected by rods 44 with a socket ring 45 provided with a race 42 running upon bearing balls 46 which engage a race 47 and are held properly spaced by a cage 48. Trunnions 49 located centrally in the plane of the socket ring 45, connect this ring with an intermediate ring or sleeve 50 pivotally connected with the shaft 22 by means of a pin 51 located in the same plane with the trunnions 49, but at a right angle to the axis of said trunnions. At 52 we have indicated a reservoir from which the pump may be filled at the beginning of the operation, and which also serves as an expansion chamber for the oil as it becomes heated during the operation. A vent 52ª places this chamber in communication with the surrounding air. At the bottom of the casing 23 we provide a drain plug 53. The race 47 forms part of or is rigidly secured to the tilting box 54 which is normally stationary but may be adjusted to different inclinations, being fulcrumed on the casing 23 by means of trunnions 55 which are in line with the point where the axis of the pin 51 intersects the axis of the shaft 22.

The tilting box 54 has two forks 56 extending from it in planes perpendicular to its axis of oscillation or adjustment formed by the trunnions 55. The opposing members of each fork constitute slideways on which blocks 57 (Fig. 3) may move in and out relatively to the forks. The blocks 57 have round holes through which extend trunnions 58 projected from a long piston 59. Each of these trunnions 58 also extends through openings in blocks or slides 60 guided to move vertically in suitable ways 61 of the casing 23. This construction supports the long piston at its central portion and keeps it from being bent. This central portion has a hole 62 into which is fitted a stud 63, with a slight play, so that the stud may have a slight independent movement in said opening. Normally that is with the stud 63 in the neutral position or in the center of the hole 62, there is a clearance on each side (both above and below) between the stud and the walls of the hole. The stud 63 is secured to or made integral with, a rack 64 movable up and down in suitable guides 65 of the casing 23. This rack is in mesh with a toothed sector 66 mounted upon a horizontal shaft 67 journaled in the casing 23 and projecting therefrom so that it may be turned by means of a suitable crank or handle (not shown) applied to the free end of the shaft. The upper and lower portions 68 of the piston 59 are tubular and are provided near the central portion with ports leading to channels 69 which communicate with the interior of the casing 23 which, as will be understood, is filled with oil. Adjacent to said ports are seats for valves 70 opening outwardly and pressed toward their seats by light springs 71 whose outer ends bear against apertured holders or spiders 72 fitted within the bore of the piston and carried by the inner ends of pins or stems 73. The outer ends of these stems are enlarged and screw-threaded as at 74 to fit into the outer ends of the tubular piston portions 68. The stud 63 has a flattened end portion, and on each side a pin member or valve lifter 75 is interposed between the flat face of the stud 63 and the corresponding ball valve 70. The lifter may engage the valve permanently, or a slight play may be allowed. Each tubular piston portion 68 is fitted to slide up or down in a stationary cylinder 76 and held by means of three set screws 77 carried by a sleeve 78. Only one of these set screws appears in Fig. 4. These sleeves screw into suitable sockets 79 of the casing 23, and the outer ends of the cylinders are engaged by screw plugs 80 closing the outer ends of the sleeves 78. This construction allows the parts to be assembled and dismembered readily. The screws 77 hold each cylinder 76 against the corresponding plug 80, but they allow the other end of the cylinder, and in fact the whole of the cylinder, some latitude of movement, since there is a clearance between the bottom (or top) of the annular groove and the ends of the screws which project into said groove, and also a clearance between the cylinder and the inner wall of the sleeve 78. The purpose of this play is to insure freedom for the up and down movement of the piston 59. 68 in the cylinders 76 without binding, while the sections 68 are closely fitted to these cylinders, no great nicety of alinement of the parts being required. The space within each cylinder 76 communicates with the space within the corresponding tubular piston portion 68 by means of a duct 81 extending through the stem 73 and its enlarged end 74.

In order that the operation of the improved adjusting and locking device may be fully understood, we will first explain, with particular reference to Figs. 7 to 12, how variations arise in the position of the center of pressure on the tilting box 54 and on the socket ring 45. Let us suppose that the port 28 shown in these views at the right hand, is the high pressure of delivery port.

In the positions or phases illustrated by Figs. 7 and 8 (and also 9 and 12) four of the nine cylinders 32 of the rotary barrel 31 have their ports 33 in communication with the said delivery or high-pressure port 28 of the stationary valve plate 25. The other five cylinders are either in communication with the suction or low-pressure port 27 on the other side of the valve plate, or else cut off on the solid portions or "lands" at the top and at the bottom of the valve plate. Of course, the oil being driven out of the said four cylinders exerts a back pressure against the respective pistons 43, and thence through the connecting rods 44, the socket ring, 45 and the ball thrust bearing 46, 47, against the tilting box 54. This pressure would have no tendency to tilt the tilting box 54 on its trunnions 55 if the center of pressure of the four cylinders I, II, III and IV was in the horizontal plane passing through the axes of the two trunnions 55 on which the tilting box 54 is mounted. But as matter of fact, the center of pressure of these cylinders when in the phase shown in Fig. 7 is at the point G, which is below this horizontal plane. In Fig. 1 this center of pressure may be indicated by the arrow G. It will be seen that at this instant the tendency is to tilt the tilting box from the position shown toward the position in which the plane of the ball thrust bearing would be at right angles to the axis of the shaft 22. It may be added that the location of the center of pressure of cylinders I, II, III and IV can be determined by drawing a line from the center of cylinder I to the center of cylinder II, and another line from the center of cylinder III to the center of cylinder IV and then connecting the central points of these two lines. The central point of this last connecting line is the true location of the point G, the center of pressure of these four cylinders.

In Fig. 8 the cylinders are shown in a different phase of the rotation as related to the valve plate port 28. Adopting the same method of locating the center of pressure, we now find that it is at H, which is above the horizontal plane passing through the axes of the tilting box trunnions (see also arrow H in Fig. 1). At this instant, and in fact whenever the center of pressure is above the horizontal plane, the tendency is to tilt the tilting box away from its present position and make it occupy a position still farther removed from that in which the ball thrust bearing would be in a plane at right angles to the shaft 22. While the cylinder barrel 31 is rotating the location of the center of pressure is constantly changing. It will move from one side of the horizontal plane to the other according to the phase of the cylinder ports 33 in relation to the high pressure valve plate port 28. The cycle of the changes of position of the center of pressure is made as many times per revolution of the shaft as there are cylinders 32 in the cylinder barrel 31. Thus it will be seen that if, for example, there are nine cylinders in the cylinder barrel there are in each revolution nine periods during which the tendency is to tilt the tilting box toward the right angle position, and nine periods during which the tendency is to tilt the tilting box away from the right angle position. The effect of turning the shaft 67 and the pinion 66 say in the left hand direction, as shown by the arrow in Fig. 4 is to move the rack 64 upward, take up the clearance on the upper side of the stud 63, move the pin 75, and thus raise the upper ball 70 from its seat. If the tendency toward an oscillating movement of the tilting box, as described above, is not immediately effective, the stud 63 by bearing against the upper wall of the hole 62 in the piston 59 will move the piston upward, and thus through the medium of the trunnions 58 and the blocks 57 will tilt the tilting box. The tendency of the tilting box to oscillate will assist the stud to move the piston upward by the method now to be pointed out—or the tendency to oscillation of the tilting box may alone cause the piston to move upward before the stud 63 actually touches the upper side of the hole in the piston 59. When stud 63 is at its neutral position, both balls are seated, and the piston sections 68 cannot move up or down in the cylinders 76 because the cylinders are full of oil. Therefore the fork 56 of the tilting box 54, the position of which is determined by the position of the piston, does not allow the tilting box to tilt on its trunnions, but locks it rigidly in its position, whatever that position may be. But when the control shaft 67 and the pinion 66 are turned left hand, according to the above supposition, so that the rack 64 with its stud 63 moves upward and the pin 75 raises its ball 70 from its seat, then the oil in the upper cylinder 76 is free to flow past the ball valve 70, thus allowing the piston to move upward. This the piston has a tendency to do at the instant when the fork 56 of the tilting box 54 tends, on account of the location of the center of pressure for that moment below the horizontal plane passing through the trunnions 55, to move upward.

The upward movement of the piston causing a slight vacuum in the lower cylinder 76 the oil of the pump case under atmospheric pressure depresses the spring 71 supporting the lower ball 70 and allows oil from the case 23 to flow in to the lower cylinder 76. At the next instant the center of pressure being above the said horizontal plane, the fork 56 tends to move downward, but it cannot move the piston 59, 68 downward for the lower valve ball 70 now being seated prevents this. The operator is still turning the pinion 66 in the left hand direction and the stud 63 is moving upward in the hole 62 in the piston 59 while the piston itself is being caused to go upward by the tendency of the tilting box 54 to oscillate, as just described. Thus the operator brings about a follow-up movement, keeping the upper ball 70 off its seat so that the pressures in the machine can cause the piston 59, 68 to go upward. As just explained, they cannot cause it to go downward. Thus the operator is able by very slight effort to utilize the forces in the machine to do his work. This work is done more quickly than he could do it himself by manual effort, and when the slight effort which he exerts ceases, the position of the tilting box 54 becomes fixed, as already shown, so that he does not have to exert any effort in keeping the tilting box where it is.

If the operator should turn the control shaft 67 and pinion 66 in the right hand direction, it is evident that the internal forces of the machine will move the piston downward, or will assist him to do so.

In Figs. 9, 10, 11 and 12 we have illustrated the operation of this invention in connection with valve plate ports having small extensions 34 of the character described in Letters Patent No. 925,148. The vertical line shown in each of these four views divides the low pressure side (say, on the left) from the high pressure side (say, on the right.) These figures also differ from Figs. 7 and 8 by showing only the cylinder ports and not the cylinders themselves. Fig. 9 corresponds to Fig. 7, and illustrates a different method for locating the center of pressure for the four cylinders whose ports I, II, III, IV are (at this stage) in communication with the delivery or high pressure port 28. A line is drawn connecting the centers of the ports I and IV, another line connects the centers of the ports II and III, the central points of these two lines are connected, and the central point A of this transverse line is the resultant center of pressure, corresponding to the point G of Figs. 1 and 7. If we suppose the cylinder barrel to be rotating clockwise as indicated by the arrows, the cylinder ports will soon reach the position shown in Fig. 10, where the port IX communicates with the valve plate port 28 while the latter is still in communication with the cylinder ports I, II, III, and IV. There will then be five cylinders under pressure and the resultant center of pressure will be shifted instantly from the point A inward along the line connecting A with the center of port IX, to the point B. As long as these same five ports remain in communication with the high pressure port 28 (say up to and including the position Fig. 11) the center of pressure remains at the same point of the rotating barrel and therefore moves in the arc of a circle, as indicated at B—C. A still further rotation of the barrel 31 will bring the port IV over the land (at the bottom of Fig. 12) between the high pressure port 28 and the low pressure port 27, so that now only the cylinder ports IX, I, II and III communicate with the high pressure port 28. The instant only four cylinder ports are in communication with the port 28, the resultant center of pressure is shifted diagonally outward to a point D which is at the same distance from the axis or center O as the point A, but above the horizontal line indicating the horizontal plane passing through the trunnions 55. This is the position shown in Fig. 12 (which corresponds to Fig. 8). By a further rotation the barrel 31 passes from the position shown in Fig. 12 to one similar to that shown in Fig. 9, and during this stage the center of pressure moves along the arc D, A. The operation is then repeated. Thus at each revolution of the barrel 31, the resultant center of pressure will move or shift nine times in the following path: From the point A (Fig. 9) diagonally inward and upward to the point B, then downward along the arc B—C then diagonally outward and upward to the point D and finally downward along the arc D—A.

From the above it will be evident that the tilting box 54 or any other structures containing the nine connecting rod sockets, will have a tendency to oscillate if the tilting box is supported on an axis parallel with the horizontal line shown in Figs. 9 to 12, for the reason that a part of the time the resultant center of pressure is above the line and a part of the time below. In actual practice, however, time becomes a very important element. For example, when port IX enters communication with the high pressure port 28, the liquid cannot pass through the restricted opening 34 forming the beginning of a communication (Fig. 10) before the cylinder barrel has rotated a perceptible distance. For example, should this be rotating at the rate of 500 revolutions per minute, the port IX may be carried a distance of 3° or 4°, or possibly more, before the full pressure can be brought to bear on the piston corresponding to port IX. The result will be that the center of pressure will not be shifted instantly from A to B, but will be carried downward farther than A, while at the same time it is being shifted toward IX as rapidly as IX can be brought under high pressure. The result will be as indicated in Fig. 13 wherein the pressure is indicated as shifted from A' to B', all being below the horizontal line. Furthermore when port IV passes from the pressure and is on the blank space at the bottom, it carries with it the same pressure which it had received from the high pressure port 28 and is only relieved gradually. This will cause the resultant pressure to be carried down below C, as indicated in Fig. 13 to a point C', gradually being shifted diagonally across to D', but not reaching D' until the cylinder barrel has rotated a perceptible distance. The result of this time element may be such as to keep the pressure entirely below the central horizontal line, or at least the greater part of the pressure movement will be below this line. This would cause the oscillating tilting box to have a tendency to move in one direction only, but with varying pressure. There is, however, another element in the practical operation of the mechanism which may have a very decided effect, and it may be so controlled as to not only modify the movement of the center of pressure as indicated above, but may even predominate over these movements. We refer to the effect produced by widening the blank spaces or lands between the ports 27 and 28 (in the manner set forth in Reynold Janney's Patent No. 951,278 of March 8, 1910) or by restricted extensions 34 of these ports into these blank spaces as indicated by the dotted lines in Figs. 9 to 12. For example, when port IX is over the land at the top (Fig. 10) the piston corresponding to this port may be moving so as to compress any fluid in front of it after port IX passes the center of the land, moving to the right. This will cause the pressure in the cylinder in front of the piston to reach any amount desired before the port IX enters into communication with the high pressure port 28 of the valve plate. This may cause resultant pressure to be shifted from A to B independently of the high pressure port 28 of the valve plate. Moreover port IV as it passes from the land at the bottom (Figs. 11 and 12) may enter communication with the low pressure port 27 so late that the piston corresponding to port IV has a perceptible distance to recede before cylinder port IV enters communication with the low pressure port 27. This recession of the piston will cause an immediate reduction of the pressure on it and so may effect the shift of the center of pressure from C to D.

By combining the two effects or factors described above it is possible to cause the resultant center of pressure to shift across the horizontal center line in such manner as to bring about any desired oscillating effect in the tilting box that is subjected to the piston pressures.

The tilting of the tilting box 54 is affected not only by the shifting of the center of pressure as described above, but by other causes, particularly the elasticity of the parts and the inertia of the oil.

While described as a pump, the device illustrated may also be operated as a motor.

We claim:

1. In a mechanical structure, the combination of an adjustable part which during the operation of said structure is subjected to pulsations, a piston operatively connected with said part to vary its position, stationary spaced cylinders in which the respective ends of said piston are movable, said piston having two passages leading from the respective stationary cylinders, check valves controlling said passages, an operating member having a limited movement lengthwise of the piston to first unseat one of the check valves and then engage the piston, and means for actuating said member.

2. In a mechanical structure, the combination of an adjustable part which during the operation of said structure is subjected to pulsations, a piston operatively connected with said part to vary its position, stationary spaced cylinders in which the respective ends of said piston are movable, said piston having two passages leading from the respective stationary cylinders, check valves controlling said passages, an operating member movable relatively to the piston and adapted to unseat one or the other of said check valves, and means for actuating said member.

3. In a mechanical structure, the combination of an adjustable part which during the operation of said structure is subjected to pulsations, a piston operatively connected with said part to vary its position and having a transverse aperture or socket in its central portion, stationary cylinders in which the respective ends of said piston are movable, an operating member having a portion or lug projecting into said socket and capable of an independent movement therein, and means controlled by such independent movement, for opening an outlet from one or the other of said cylinders.

4. In a mechanical structure, the combination of an adjustable part which during the operation of said structure is subject to pulsations, a piston operatively connected with said part to vary its position and provided at its central portion with a transverse aperture or socket, and with communicating ports and also provided with passages leading from the piston ends to said ports, stationary cylinders in which the respective piston ends are movable and with which said passages communicate, check valves located in said passages and opening toward the cylinders and an operating member having a portion projecting into said socket and capable of an independent movement therein to unseat one or the other of said check valves.

5. In a mechanical structure, the combination of an adjustable part which during the operation of said structure is subjected to pulsations, a piston operatively connected with said part to vary its position; stationary cylinders in which the respective ends of the said piston are movable, sleeves into which said cylinders are fitted loosely, means for securing the outer portions of the cylinders to the sleeves in such manner as to allow some relative play, an operating member movable relatively to the piston, and means, controlled by such movement of the operating member, for opening an outlet from one stationary cylinder or the other.

6. In a mechanical structure, the combination of an adjustable part which during the operation of said structure is subjected to pulsations, a piston operatively connected with said part to vary its position, stationary cylinders in which the respective ends of the said piston are movable, sleeves into which the said cylinders are fitted loosely, means for securing the outer portions of the cylinders to the sleeves in such a manner as to allow some relative play, means for closing the outer ends of the sleeves, an operating member movable relatively to the piston, and means, controlled by such movement of the operating member, for opening an outlet from one stationary cylinder or the other.

7. In a mechanical structure, the combination of an adjustable part which during the operation of said structure is subject to pulsations, a piston whose central portion is operatively connected with said adjustable part to vary its position, stationary cylinders in which the respective ends of the piston are movable, means for bracing and guiding the central portion of the piston, and mechanism for controlling the movement of the piston.

8. In a mechanical structure, the combination of a pivoted adjustable part, a member movable transversely of the pivot of said part and operatively connected with said part to vary its inclination, spaced guiding means engaging the ends of said member, separate means for guiding and bracing the central portion of said member, and mechanism for controlling the movement of said member.

In witness whereof we have hereunto set our hands in the presence of two subscribing witnesses.

HARVEY D. WILLIAMS.
REYNOLD JANNEY.

Witnesses as to Harvey D. Williams:
F. W. DELMAR,
E. B. KEARNEY.

Witnesses as to Reynold Janney:
CHAS. P. HAIGHT,
RALPH B. DAY.

---

Correction in Letters Patent No. 1,062,561.

It is hereby certified that Letters Patent No. 1,062,561, granted May 20, 1913, upon the application of Harvey D. Williams and Reynold Janney, of New York, N. Y., for an improvement in "Oscillation-Control Mechanism," was erroneously issued to the inventors, said Williams and Janney, whereas said Letters Patent should have been issued to *Waterbury Tool Company, of Waterbury, Connecticut, a corporation of Connecticut*, said corporation being owner of the entire interest in said invention as shown by the records of assignments in this Office; and that the said Letters Patent should be read with this correction therein, that the same may conform to the records of the case in the Patent Office.

Signed and sealed this 17th day of June, A. D., 1913.

[SEAL.]

C. C. BILLINGS,
*Acting Commissioner of Patents.* operation of said structure is subjected to pulsations, a piston operatively connected with said part to vary its position, stationary cylinders in which the respective ends of the said piston are movable, sleeves into which said cylinders are fitted loosely, means for securing the outer portions of the cylinders to the sleeves in such manner as to allow some relative play, an operating member movable relatively to the piston, and means, controlled by such movement of the operating member, for opening an outlet from one stationary cylinder or the other.

6. In a mechanical structure, the combination of an adjustable part which during the operation of said structure is subjected to pulsations, a piston operatively connected with said part to vary its position, stationary cylinders in which the respective ends of the said piston are movable, sleeves into which the said cylinders are fitted loosely, means for securing the outer portions of the cylinders to the sleeves in such a manner as to allow some relative play, means for closing the outer ends of the sleeves, an operating member movable relatively to the piston, and means, controlled by such movement of the operating member, for opening an outlet from one stationary cylinder or the other.

7. In a mechanical structure, the combination of an adjustable part which during the operation of said structure is subject to pulsations, a piston whose central portion is operatively connected with said adjustable part to vary its position, stationary cylinders in which the respective ends of the piston are movable, means for bracing and guiding the central portion of the piston, and mechanism for controlling the movement of the piston.

8. In a mechanical structure, the combination of a pivoted adjustable part, a member movable transversely of the pivot of said part and operatively connected with said part to vary its inclination, spaced guiding means engaging the ends of said member, separate means for guiding and bracing the central portion of said member, and mechanism for controlling the movement of said member.

In witness whereof we have hereunto set our hands in the presence of two subscribing witnesses.

HARVEY D. WILLIAMS.
REYNOLD JANNEY.

Witnesses as to Harvey D. Williams:
F. W. DELMAR,
E. B. KEARNEY.

Witnesses as to Reynold Janney:
CHAS. P. HAIGHT,
RALPH B. DAY.

---

Correction in Letters Patent No. 1,062,561.

It is hereby certified that Letters Patent No. 1,062,561, granted May 20, 1913, upon the application of Harvey D. Williams and Reynold Janney, of New York, N. Y., for an improvement in "Oscillation-Control Mechanism," was erroneously issued to the inventors, said Williams and Janney, whereas said Letters Patent should have been issued to *Waterbury Tool Company, of Waterbury, Connecticut, a corporation of Connecticut*, said corporation being owner of the entire interest in said invention as shown by the records of assignments in this Office; and that the said Letters Patent should be read with this correction therein, that the same may conform to the records of the case in the Patent Office.

Signed and sealed this 17th day of June, A. D., 1913.

[SEAL.]

C. C. BILLINGS,
*Acting Commissioner of Patents.*

Correction in Letters Patent No. 1,062,561.

It is hereby certified that Letters Patent No. 1,062,561, granted May 20, 1913, upon the application of Harvey D. Williams and Reynold Janney, of New-York, N. Y., for an improvement in "Oscillation-Control Mechanism," was erroneously issued to the inventors, said Williams and Janney, whereas said Letters Patent should have been issued to *Waterbury Tool Company*, *of Waterbury, Connecticut, a corporation of Connecticut*, said corporation being owner of the entire interest in said invention as shown by the records of assignments in this Office; and that the said Letters Patent should be read with this correction therein, that the same may conform to the records of the case in the Patent Office.

Signed and sealed this 17th day of June, A. D., 1913.

[SEAL.]

C. C. BILLINGS,

*Acting Commissioner of Patents.*